United States Patent [19]
Walker

[11] 3,913,413
[45] Oct. 21, 1975

[54] SAFETY GUARD STRUCTURE
[76] Inventor: Brooks Walker, 807 Francisco St., San Francisco, Calif. 94109
[22] Filed: May 6, 1974
[21] Appl. No.: 467,303

[52] U.S. Cl. .................... 74/612; 74/616; 100/53; 192/134
[51] Int. Cl.² .......................................... F16P 3/00
[58] Field of Search ............ 74/612, 613, 614, 615, 74/616; 100/53; 192/134

[56] References Cited
UNITED STATES PATENTS
1,166,918   1/1916   Graham .............................. 74/616
1,919,868   7/1933   Shaw ................................... 74/613
3,819,022   6/1974   Svensson et al. ................ 74/612 X Primary Examiner—Samuel Scott
Assistant Examiner—F. D. Shoemaker
Attorney, Agent, or Firm—Gordon Wood

[57] ABSTRACT

A safety guard structure including a guard member adapted to be interposed between a mechanism such as a punch press and the operator thereof to protect the operator from injury. In one form of the invention the guiding frame for guiding the guard member between its upper and lower positions is swingably connected to the mechanism to be guarded to permit the entire guiding frame to be swung upwardly so as to present no interference when it is desired to modify the mechanism or to change the dies thereof. In another form of the invention the guide structure for the guard member is entirely positioned above the area to be protected so as to present no interference when it is necessary for operators to work around the machine. An interlocking device is provided to prevent operation of the mechanism except when the guard member and its guide structure are in proper operating position.

3 Claims, 15 Drawing Figures

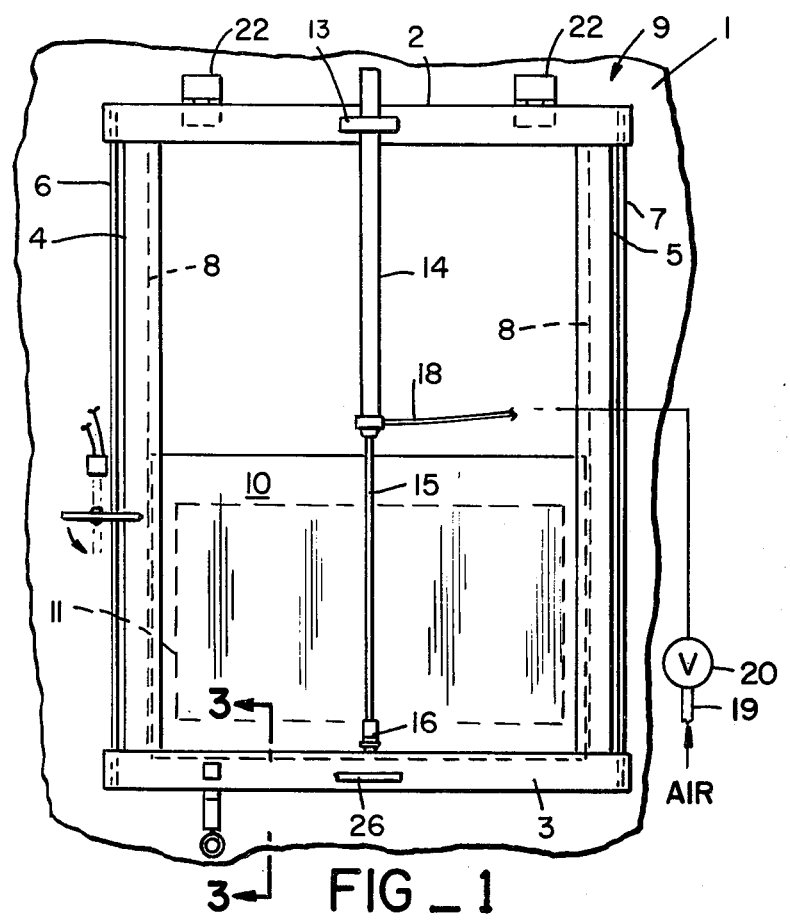
FIG_1
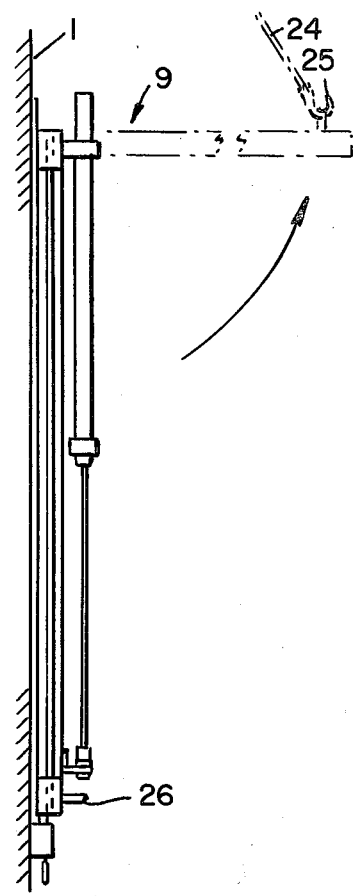
FIG_2
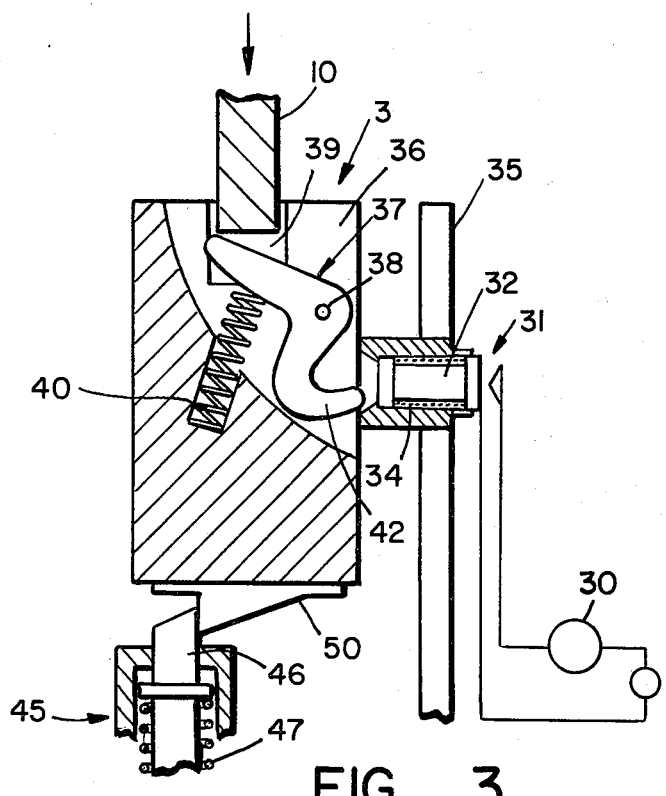
FIG_3
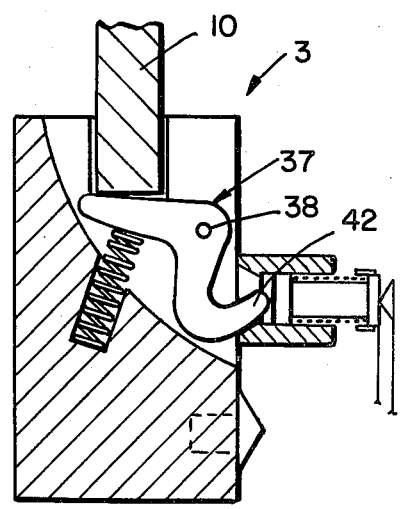
FIG_4

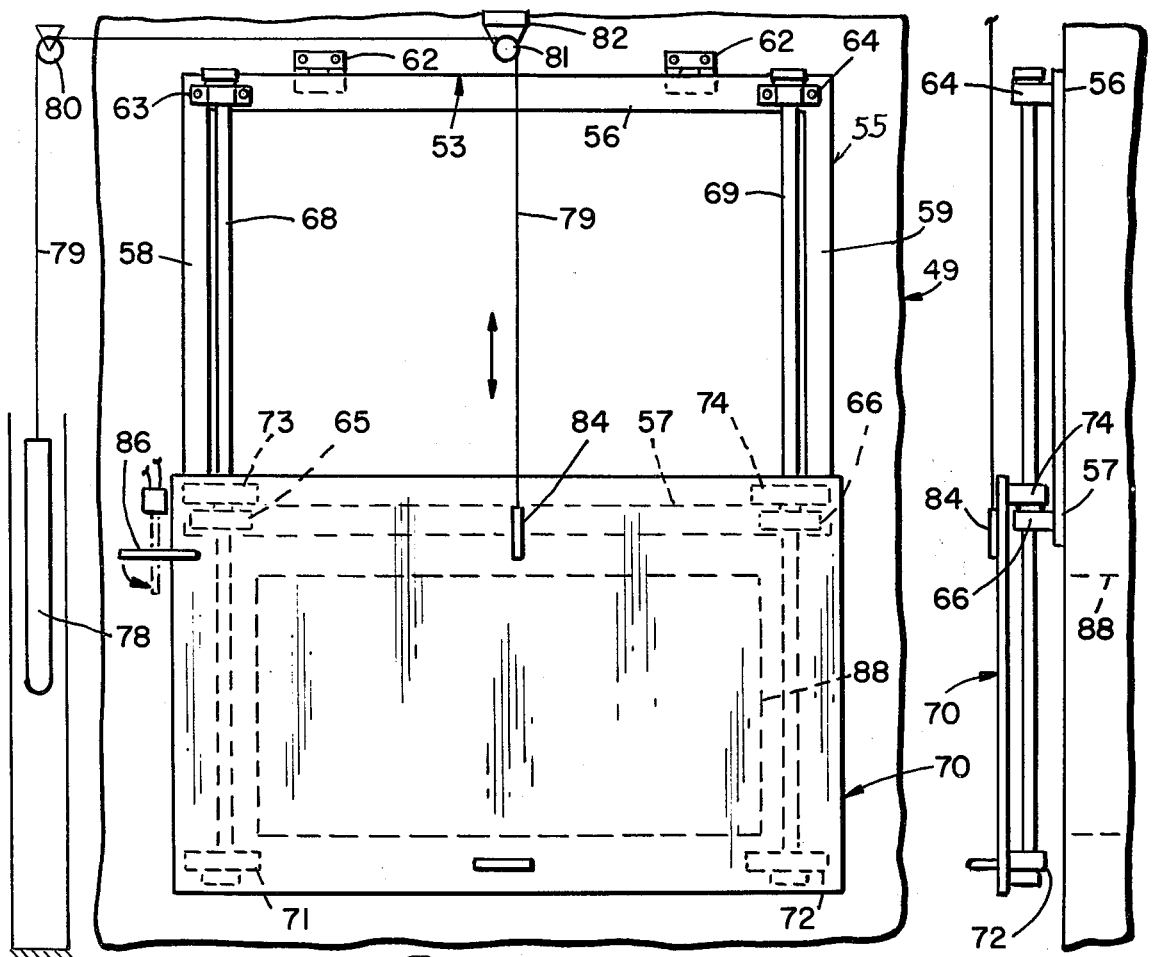
FIG_5
FIG_6
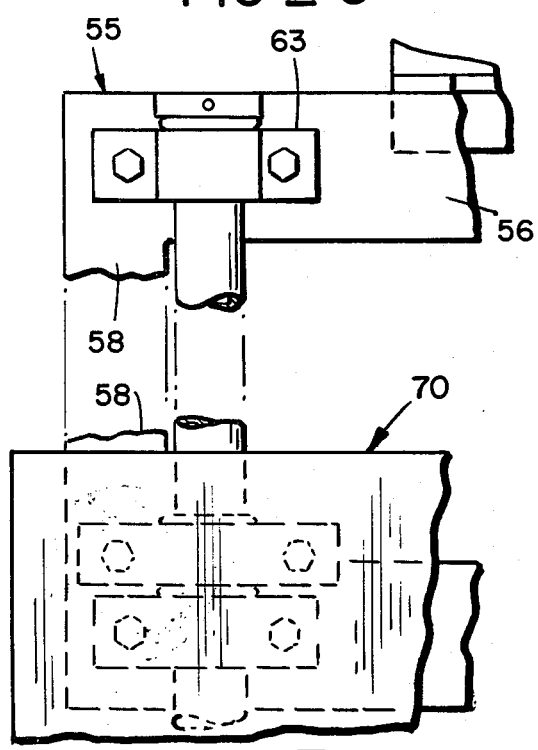
FIG_7
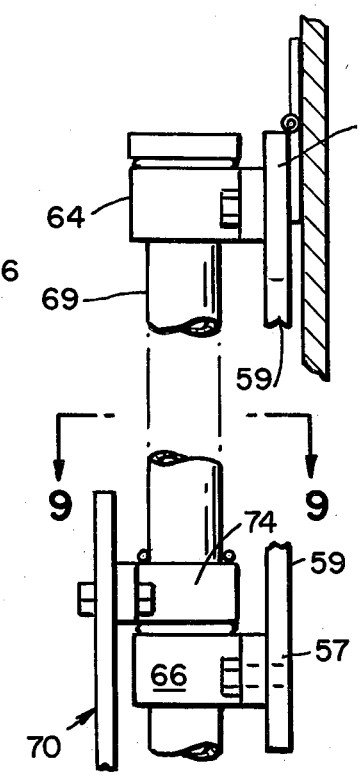
FIG_8
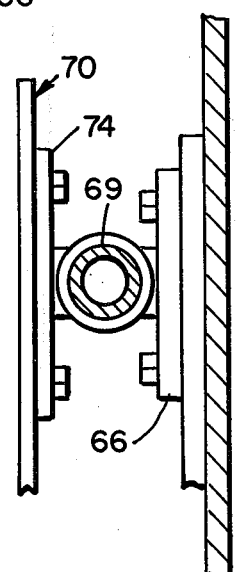
FIG_9

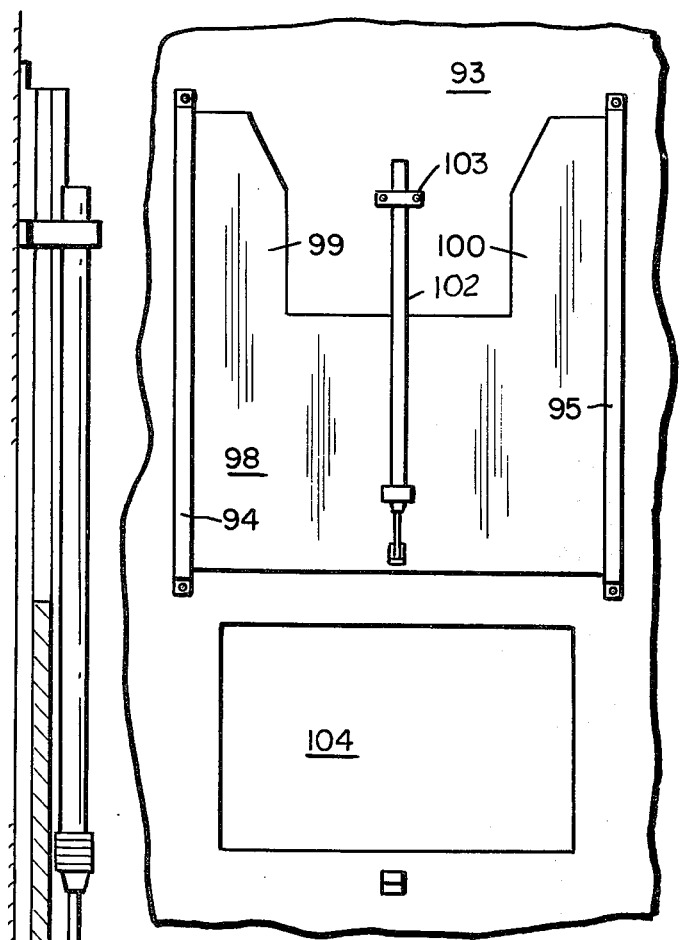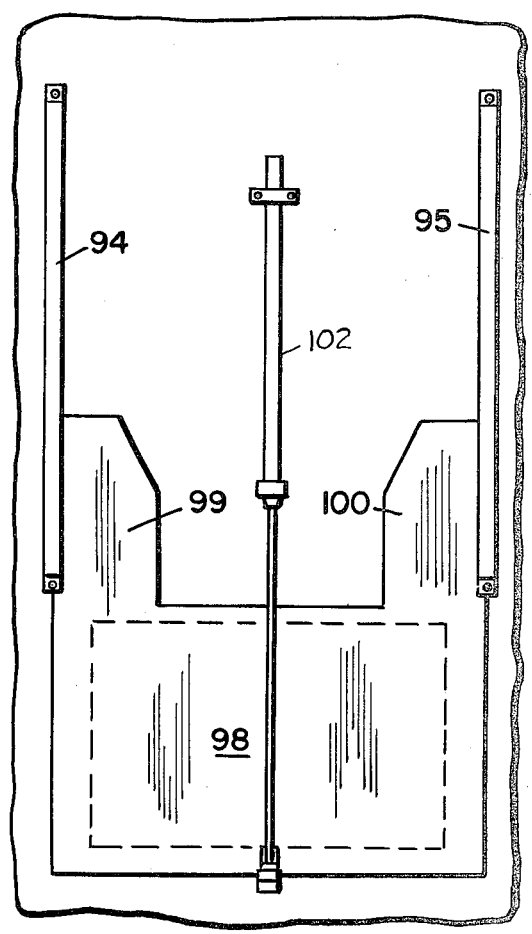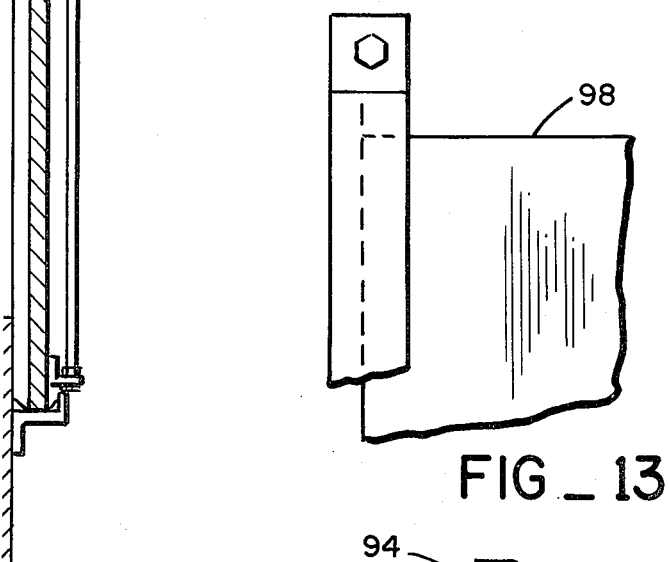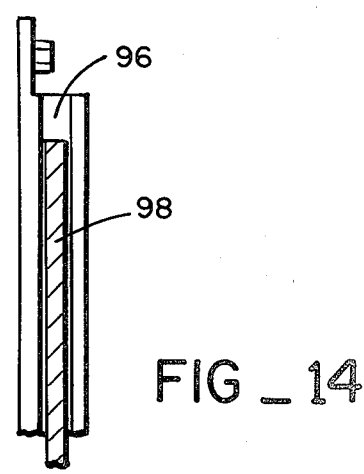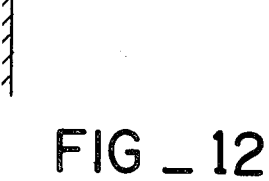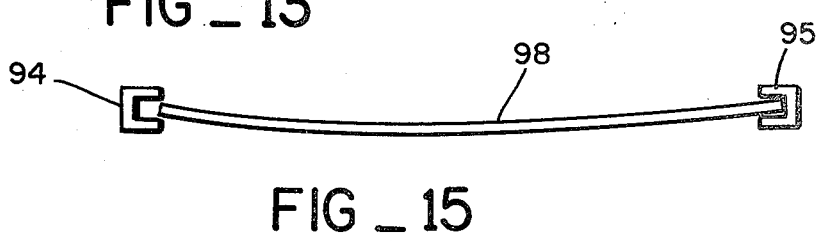

SAFETY GUARD STRUCTURE

This invention relates to a safety guard structure which includes a guard member adapted to be interposed between a mechanism such as a punch press and the operator thereof so as to prevent injury to the operator while the mechanism is running.

Heretofore various types of safety guards have been provided for the same purpose as the present invention but such prior art guards have had certain disadvantages that impair their usefulness. One disadvantage is that the guide means which permits the guard member to be raised from a lower working position to an upper inoperative position have presented interference when it is desired to change dies, as for example on a punch press, or to perform any other operation in which lateral clearance is required. In the type of safety guard structure wherein vertically extending guide members are employed to guide the guard member between its upper and lower positions, such guide members have interfered with the operators when it is desired to modify the operation of the mechanism. In some instances the dies employed in the mechanism are so heavy that a fork lift truck is required to handle such dies and in many cases the guide members have been damaged by the truck during the die replacement operation.

The main object of the present invention is to overcome certain disadvantages of prior art safety guard structures including the one outlined above.

Another object of the invention is the provision of a safety guard structure that includes an interlock which, although requiring only one switch, prevents the operation of the punch press or other mechanism unless both the guiding means and the guard member itself are in the safety guarding position.

Other objects and advantages of the present invention will be seen from the following specification and from the drawings.

FIG. 1 is a front elevation of the safety guard structure showing schematically the pneumatic operating means.

FIG. 2 is a side elevation of the structure of FIG. 1.

FIG. 3 is a vertical sectional view through the lower crosspiece of the guiding means showing schematically the electrical circuit of the punch press or other mechanism and the switch mechanism in retracted position.

FIG. 4 is a view similar to FIG. 3 showing the switch mechanism in projected position.

FIG. 5 is a front elevation of a modified form of safety guard structure.

FIG. 6 is a side elevation of the structure of FIG. 5.

FIG. 7 is an enlarged fragmentary view of one of the guiding means of FIGS. 5,6.

FIG. 8 is a side elevation of the structure of FIG. 7.

FIG. 9 is a horizontal sectional view taken in a plane indicated by lines 9—9 of FIG. 8.

FIG. 10 is a front elevation of another modified form of the invention with the guard member in its up position.

FIG. 11 is a view similar to FIG. 10 but with the guard member in its down position.

FIG. 12 is a side elevation of the structure of FIG. 11 with the guard member shown in its lower working position.

FIGS. 13, 14 are details of the guiding means.

FIG. 15 is a horizontal sectional view through the guiding means showing schematically how the guide member may be installed.

First with reference to FIG. 1, the invention is adapted to be employed with a mechanism such as a punch press indicated at 1 in dot-dash lines in FIG. 1. The safety guard structure comprises upper and lower cross pieces 2, 3 respectively and a pair of vertically extending side pieces 4, 5. By means of tie rods 6, 7, the assembly, generally designated 9, may be secured together as a unitary structure. Welding or other means of securing the corners together may be used.

The vertically extending pieces 4, 5 are provided with inwardly opening grooves 8 in which are received the vertically extending side edges of a generally rectangular guard member 10. This guard member 10 may be made of any suitable impact resistant transparent plate such as the plastic Lexan. The guard member 10 is shown in its lower working position in FIG. 1, in which position it is in registration with the rectangular area to be protected which is indicated by dot-dash lines in FIG. 1 and identified by the numeral 11. The guard member 10 may be raised from its working position of FIG. 1 to a position spaced above the area 11 by means of an air cylinder generally designated 14. This cylinder 14 is secured at its upper end by means of a bracket 13 to the upper cross piece 2. The piston rod 15 of cylinder 14 is secured at its lower end by means of a fitting 16 to the guard member 10 at a point adjacent the lower edge of the latter. By means of a flexible conduit 18, compressed air may be introduced into the lower end of the cylinder 14 from a source 19 of high pressure air. A three-way valve 20 permits the cylinder 14 to be connected either to the air source or to the atmosphere so that actuation of the valve 20 permits the guard member 10 to be raised by compressed air or to be lowered by gravity when the valve 20 is in the exhaust position.

The upper cross piece 2 of the guide structure is hingedly secured to the front face of the mechanism 1 by means of a pair of horizontally spaced hinges 22 which permit the entire guide assembly, upper and lower cross pieces 2, 3 and vertically extending pieces 4, 5, to be swung upwardly from the vertically extending position of FIG. 1 to a horizontally extending position indicated by dot-dash lines in FIG. 2. In this latter position the guide means 9 may be held in its upper inoperative position by means of a flexible member 24 provided with a hook 25 adapted to be received in a fitting 26 carried by the lower cross piece 3 of the guide means 9.

In FIG. 3 there is shown schematically an electrical circuit for controlling the clutch or driving means 30 of the punch press or other mechanism 1. This circuit includes a normally open switch 31 which is adapted to be closed by a plunger 32 which is urged at all times toward an inner position shown in FIG. 3 by means of a compressioin spring 34. The housing for switch 31 may be secured to any suitable support 35 secured to the mechanism 1. Adjacent the switch 31 the lower cross piece 3 of guide means 9 is provided with a slot 36 in which is received an actuator 37 swingably mounted on a pin 38 carried by cross piece 3. This actuator 37 is formed with an upper leg which extends into a groove 39 formed on the lower cross piece 3 and in which groove the lower edge of the guard member 10 is adapted to be received when the latter is in its lower working position. The actuator 37 is urged in a clockwise direction to the position shown in FIG. 3 by means of a compression spring 40 mounted in cross piece 3. The lower end of actuator 37 is provided with another leg 42 which is adapted to be received within the housing of switch 31 and to engage the inner end of plunger 32 for urging the latter outwardly when the guard member 10 is in its lower working position of FIGS. 1 and 4.

Positioned under the cross piece 3 and supported by any convenient structure, is a latch generally designated 45 including a latch bolt 46 which is spring pressed upwardly by means of a compression spring 47 to the position shown in FIG. 3. The lower side of the cross piece 3 is provided with a strike 50 which retracts the latch bolt 46 when the guide means is swung downwardly to its lower working position and which strike serves to hold the assembly in its working position when the latch bolt 46 is projected upwardly by spring 47.

It will be noted that the one switch 31 which closes the circuit to permit the motor 30 to be energized is operative only when two conditions exist. These conditions are: the frame comprising the guide means 9 must be in its lower operative position, and secondly, the guard member 19 must be in its lower working position. In other words, by means of only one switch, two safety precautions exist.

FIGS. 5-9 disclose a modified form of the invention for use in a similar punch press or other mechanism 49. In this case the guide means is supported on a frame generally designated 55 which may be formed of flat bars to provide upper and lower cross pieces 56, 57 and vertically extending side pieces 58, 59. Said guide means comprising frame 55 may also be hingedly secured to the mechanism 49 by means of hinges 62.

Secured to the frame 55 are upper bearings 63, 64 and lower bearings 65, 66. The left hand pair of bearings 63, 65 are adapted to receive therethrough a guide tube 68 and the right hand pair of bearings 64, 66 are adapted to receive a similar guide tube 69. These guide tubes 68, 69 are secured at their lower ends adjacent the lower edge of the guard member generally designated 70 by means of brackets 71, 72. Similarly the guide tubes 68, 69 are secured by means of brackets 73, 74 to the guard member 70 adjacent the upper edge of the latter. In this case the guard member 70 is gravity actuated by means of a weight 78 which is connected at its upper end to a flexible line 79 reeved around a fixed pulley 80 and then around a second pulley 81 which is secured by means of a hinge 82 to the mechanism structure. The line 79 is then connected by means of a bracket 84 to the guard member 70. When the guard member 70 is in its lower working position relative to its motion about hinge 62 it may be held there by means of a swingable catch 86. An area 88 corresponding to area 11 of FIG. 1 is indicated in dotted lines in FIG. 5. This represents the area which the guard member 70 should register with in order to protect the operator. An important feature of the present invention is that the guide means is positioned entirely above the area 88 so that when the guard member 70 is in its upper position the area 88 is completely clear of any interference. Furthermore, the space laterally outwardly of the area 88 is also unencumbered by any structure so that there is no interference of any type when it is desired to change dies or perform any other operation that might otherwise damage the guide structure.

Also in respect to the structure of FIGS. 5-9, it will be noted that the hinges 62, 82 permit the entire structure to be swung upwardly in a manner similar to that shown in FIG. 2 to a position giving further clearance to additional operations which may be required above the area 88. Such operations include the use of large wrenches on nuts and bolts which may be above opening 88 and used to secure the dies and other structures in place.

Still another modified form of the invention is shown in FIGS. 10-15. In this case the guide means for the guard member comprises a pair of vertically extending fixed guides 94, 95 which may be secured at all times to the structure of the mechanism to be protected. These fixed guides are provided with grooves 96 (FIG. 14) into which the vertically extending side edges of the guard member 98 extends. In this case the guard member 98 is provided with upwardly projecting extensions 99, 100 to increase the length of engagement with the guide members 94, 95 so as to provide additional stability to the assembly. An air cylinder 102 is fixedly secured at its upper end by means of a bracket 103 to the front side of the mechanism 93. It will be noted at this point in FIG. 10 that the entire guiding mechanism is above the area 104 to be protected. It will also be apparent upon bleeding air from the lower end of cylinder 102 that the guard member 98 will drop by gravity to the lower working position of FIGS. 11, 12. In FIGS. 1,2 and 10,11, the piston rod 15 of the cylinder 14 is secured to the guard member 10 or 98 by a rigid bracket to help guide the guard member when raising or lowering.

The assembly of the structure above described can be simplified by fitting the guard member 98 to the guides 94, 95 in the manner shown schematically in FIG. 15. It will be noted that the guard member 98, made of impact resistant flexible plastic, may be bent sufficiently in a horizontal direction to permit the vertically extending side edges of the same to be sprung into the grooves 96 of the guides 94, 95. This permits the guides 94, 95 to be installed as a first step in the assembly and then the guard member 98 and the air cylinder 102 may be installed.

It will be apparent that the above described embodiments of the invention permit the required protection to the operator to be given and at the same time eliminate any interfering structure shich may be subject to damage when modifications to the mechanism are undertaken. Furthermore, the entire front of the mechanism is accessible to the operator when the guide means disclosed is swung upwardly to the inoperative position.

As noted above, in the embodiments of the invention wherein the guard member is raised and lowered by a fluid driven cylinder, the rigid securement of the outer end of the piston rod to the guard member provides an additional guiding means to enhance the stability of the guard member.

It will be understood that the presence of the piston rod at the protected area of the guard does not obstruct the view of the operator if the latter has normal sight in both eyes.

I claim:

1. A safety guard structure adapted to be interposed between a mechanism and an operator horizontally spaced from said mechanism for protecting said operator, comprising:

a generally rectangular guard member, a frame means guiding said guard member for movement from a lower working position with at least a portion of said member registering with a vertically extending area between said mechanism and said operator to an upper position spaced upwardly from said area, and hinge means swingably supporting the upper end of said frame and having an axis of swing outwardly of said mechanism for swinging movement in a vertical plane for an operative position with said frame in working position to an operative position above and outwardly of said area.

2. A safety guard structure according to claim 1 wherein said frame includes a switch actuator, an electrical circuit for controlling said mechanism including a stationary switch, adapted to be actuated by said actuator when said frame is in said operative position and said member is in said working position.

3. A safety guard structure adapted to be interposed between a mechanism and an operator horizontally spaced from said mechanism for protecting said operator, comprising:

a generally rectangular guard member, a frame guiding said guard member for movement from a lower working position with at least a portion of said member registering with a vertically extending area between said mechanism and said operator to an upper position spaced upwardly from said area, hinge means swingably supporting the upper end of said frame for swinging movement in a vertical plane from an operative position with said frame in working position to an inoperative position above said area, said guiding means comprises two pairs of horizontally spaced apart bearings with each pair of bearings being vertically spaced and fixedly secured relative to said mechanism.

* * * * *